United States Patent Office 3,577,440
Patented May 4, 1971

3,577,440
1-SUBSTITUTED-3-AMIDO-PYRROLIDINES
Carl Dalton Lunsford and Grover Cleveland Helsley, Richmond, Va., assignors to A. H. Robins Company, Incorporated, Richmond, Va.
No Drawing. Continuation-in-part of abandoned application Ser. No. 786,420, Dec. 23, 1968. This application Nov. 7, 1969, Ser. No. 874,986
Int. Cl. C07d 27/04
U.S. Cl. 260—326.3
15 Claims

ABSTRACT OF THE DISCLOSURE 1-substituted-3-amidopyrrolidines useful as analgetics and anti-depressants are disclosed. The compounds are prepared by acylation of 1-substituted-3-aminopyrrolidines.

The present invention relates to certain novel 1-substituted-3-amidopyrrolidines, and more particularly to 1-substituted-3-alkylamidopyrrolidines and 1-substituted-3-benzamidopyrrolidines, compositions thereof, and methods of making and using same.

This application is a continuation-in-part of copending application Ser. No. 786,420 filed Dec. 23, 1968, now abandoned.

The invention is especially concerned with novel pyrrolidine compounds having the formula:

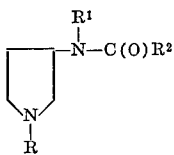

wherein:

R is hydrogen, lower alkyl, allyl, phenyl, phenoxy-lower alkyl, cyclohexyl, and phenyllower alkyl,
$R^1$ is hydrogen, lower alkyl, phenyl, cyclohexyl, loweralkoxy phenyl, hydroxyphenyl, halophenyl and trifluoromethylphenyl,
$R^2$ is lower alkyl, phenyl, nitrophenyl, aminophenyl, halophenyl, lower-alkoxy phenyl, phenoxy-lower alkyl, halophenoxy-lower-alkyl, lower-alkyl phenyl and trifluoromethylphenyl, and
pharmaceutically acceptable acid addition salts thereof, with the proviso that when R is lower alkyl, $R^1$ cannot be hydrogen.

The compounds of the invention are useful because of their pharmacological action on the central nervous system. The activity is demonstratable when the compounds are used in the form of their free base or in the form of their non-toxic acid addition salts. The preferred form of the compounds is as their non-toxic acid addition salts for increased water solubility and ease of administration.

The novel compounds of the present invention having the foregoing Formula I are generally characterized by important pharmacological activity. The compounds are analgetics, antidepressants, or both.

The analgetic effect of some compounds of this invention was evaluated by the procedure of P. Nilsen, Acta. Pharmacol. et Toxicol. 18, 10 (1961). The dose effective in 50 percent of the treated mice is recorded in the following table as compared with Darvon® and Demerol®.

| Compound of example: | $ED_{50}$, mg./kg. |
|---|---|
| 3 | 5.7 |
| 4 | 6.8 |
| 5 | 8.0 |
| 14 | 2.0 |
| 15 | 5.2 |
| 17 | 14.2 |
| 18 | 3.4 |
| 31 | 16.5 |
| Darvon® | 11.2 |
| Demerol® | 6.4 |

The anti-depressant effect of some compounds of this invention was assessed by their ability to antagonize the depressant action of tetrabenazine (2-oxo-3-isobutyl-9,10-dimethoxy - 1,2,3,4,6,7 - hexahydro-11bH-benzo[a]quinolizine) in mice [Englehardt et al. J. Med. Chem. 11 (2), 325 (1968)]. The dose effective in 50 percent of the treated mice is recorded in the following table as compared with Tofranil® and Elavil®.

| Compound of example: | $ED_{50}$, mg./kg. |
|---|---|
| 15 | 0.6 |
| 29 | 1.7 |
| 36 | 2.8 |
| 37 | 2.8 |
| 38 | 4.8 |
| 39 | 9.0 |
| 40 | 15.5 |
| 41 | 4.9 |
| 42 | 2.4 |
| 44 | 2.0 |
| 47 | 4.9 |
| 48 | 0.6 |
| Tofranil® | 1.3 |
| Elavil® | 1.1 |

It is, accordingly, an object of the present invention to provide novel compounds which are effective analgetics and anti-depressants. Another object is to provide certain novel and useful 1-substituted-3-amidopyrrolidines, compositions thereof, and methods of making and using the same. Other objects of the invention will be apparent to one skilled in the art, and still other objects will become apparent hereinafter.

In the definition of symbols in the foregoing Formula I and where they appear elsewhere throughout this specification, the terms have the following significance.

The term "lower alkyl" as used herein includes straight and branched chain radicals of up to eight carbon atoms inclusive, preferably no more than six carbon atoms, and is exemplified by such groups as methyl, ethyl, propyl, isopropyl, butyl, sec. butyl, tertiary butyl, amyl, isoamyl, hexyl, heptyl, octyl, and the like. A "lower alkoxy" group has the formula—O-lower alkyl. The term "lower alkenyl" includes straight and branched chain radicals of two up to eight carbon atoms inclusive and is exemplified by such groups as vinyl, allyl, methallyl, 4-pentenyl, 3-hexenyl and 3-methyl-3-heptenyl.

The term "lower cycloalkyl" as used herein includes primarily cyclic radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl.

The term "phenyl-lower-alkyl" as used herein includes such groups as benzyl, phenethyl, phenpropyl and the like.

By the term "phenyl" is meant the unsubstituted phenyl radical and phenyl radicals substituted by one or more substituents which are not reactive or otherwise interfering under the conditions of reaction in the processes for making the compounds. Such substituents include lower alkyl, lower alkoxy, trifluoromethyl, nitro, hydroxy, chloro, bromo, fluoro, and the like. The substituted phenyl radicals have preferably no more than one to three substituents such as those given above and, furthermore, these substituents can be in various available positions of the phenyl nucleus and when more than one substituent is present, can be the same or different and can be in various position combinations relative to each other. The lower alkyl and lower alkoxy substituents each have preferably from one to four carbon atoms which can be arranged as straight or branched chains. A total of nine carbon atoms in all ring substituents, making a total of fifteen carbon atoms in the radical, is the preferred maximum. "Phenoxy" has the formula —O-phenyl.

This invention also includes acid addition salts of the bases of Formula I with organic and inorganic acids. Such salts are easily prepared by methods known in the art. When the compounds are to be used as intermediates for preparing other compounds or for any non-pharmaceutical use, the toxicity or non-toxicity of the salt is immaterial; when the compounds are to be used as pharmaceuticals, they are most conveniently used in the form of non-toxic acid addition salts. Both toxic and non-toxic salts are therefore within the purview of the invention. The acids which can be used to prepare the preferred non-toxic acid addition salts are those which produce, when combined with the free base, salts whose anions are relatively innocuous in therapeutic doses of the salts, so that beneficial physiological properties inherent in the free bases are not vitiated by side effects ascribable to the anions.

The base is reacted with the calculated amount of organic or inorganic acid in a solvent miscible with water, such as ethanol or isopropanol, with isolation of the salt by concentration and cooling, or the base is reacted with an excess of the acid in a solvent immiscible with water, such as ethyl ether or isopropyl ether, with the desired salt separating directly. Exemplary of such organic salts are those formed with citric, acetic, lactic, maleic, fumaric, benzoic, tartaric, ascorbic, pamoic, succinic, methanesulfonic, malic, citraconic, itaconic acid and the like. Exemplary of such inorganic salts are those formed with hydrochloric, hydrobromic, sulfuric, phosphoric and nitric acids.

In general, the novel compounds of this invention are prepared by acylating appropriate 1-substituted-3-aminopyrrolidine starting materials with an acid chloride or an acid anhydride to give the corresponding amides embraced by Formula I.

The 1-substituted-3-aminopyrrolidine starting materials are prepared according to methods disclosed in United States Pat. 3,337,580. Generally, a 1-substituted-3-pyrrolidinol is converted to a 1-substituted-3-halo-, a 3-alkylsulfonyloxy-, or a 3-arylsulfonyloxypyrrolidine which is then reacted with a primary aromatic amine as, for example, aniline or a substituted aniline or with non-aromatic primary amines including cyclohexylamine, cyclopentyl amine, methylamine, ethylamine and the like to give 1-substituted-3-aminopyrrolidines.

In an alternate method, a 1-substituted-3-halopyrrolidine, a 1-substituted-3-alkylsulfonyloxypyrrolidine, or a 1-substituted-3-arylsulfonyloxypyrrolidine is reacted with phthalimide in the form of its alkali metal salt according to methods described in United States Pat. 3,316,276 to give N-(1-substituted - 3 - pyrrolidinyl)phthalimides which are reduced with hydrazine hydrate to 1-substituted-3-aminopyrrolidines.

A suitable general procedure for preparing the 1-substituted-3-amidopyrrolidines of this invention, using the starting materials given above is as follows:

A solution of an acid chloride in a suitable organic solvent as, for example, chloroform, is added dropwise to a stirred heterogenous chloroform-water solution containing a 1-substituted-3-aminopyrrolidine and a suitable acid acceptor which can be a metal carbonate or a water-soluble lower-alkyl-amine. The mixture is stirred for a period of from about 30 minutes to about one hour at room temperature. The organic layer is separated from the aqueous layer, dried over an inert drying agent as, for example, sodium sulfate, and evaporated in vacuo. The residual crude 1-substituted-3-amidopyrrolidine is purified by distillation in vacuo, conversion to an acid addition salt which is further purified by recrystallization, chromatography on magnesium silicate, or crystallization from a suitable solvent.

In an alternate method, the 1-substituted-3-aminopyrrolidine is dissolved in a solvent as, for example, chloroform, benzene toluene and the like, and an acid chloride or an acid anhydride dissolved in the same solvent is added and the reaction mixture is refluxed gently for a period of from about six hours to about 16 hours. The solvent is evaporated from the reaction mixture and the residue is treated with a base such as dilute sodium hydroxide solution or sodium bicarbonate solution and the product is isolated by extraction from the aqueous basic solution with an organic solvent as, for example, benzene or ether and evaporation of the solvent. The product is purified by methods described hereinabove.

The 1-benzyl-3-amidopyrrolidines are catalytically debenzylated in the Paar hydrogenator in about three atmospheres of hydrogen and at about 50° C., using palladium on charcoal catalyst to the corresponding 3-amidopyrrolidines which are isolated and purified by methods described above. Compounds containing a nitro-substituent on a phenyl ring are catalytically reduced in the same manner generally at room temperature to the corresponding amine.

The 3-amidopyrrolidines are further reacted with lower-alkyl halides, phenyl lower-alkyl halides and phenoxy lower-alkyl halides to give additional 1-substituted-3-amidopyrrolidines within the scope of Formula I. The reaction is generally run in an organic solvent such as chloroform, benzene, toluene and the like, containing an inorganic acid binder such as a metal carbonate. The reaction mixture is stirred, usually at the reflux temperature of the solvent employed, cooled, washed with water, concentrated and the residual material remaining after evaporation of the organic solvent is purified by one of the methods described hereinabove.

The foregoing is a general description of how to prepare the compounds of the invention. The following examples illustrate the preparation of specific compounds but shall not be construed as a limitation of the scope of the invention set forth in Formula I.

EXAMPLE 1

1-phenyl-3-(4-nitrobenzamido)pyrrolidine

A solution of 6.9 g. (0.037 mole) of 4-nitrobenzoyl chloride in 30 ml. of chloroform was added dropwise at room temperature to a stirred mixture of 6 g. (0.037 mole) of 1-phenyl-3-aminopyrrolidine and 10 g. of potassium carbonate in 30 ml. of water and 30 ml. of chloroform. The mixture was stirred 30 minutes, the chloroform layer separated, dried over magnesium sulfate and evaporated. Recrystallization of the crude solid residue from alcohol-water gave 10.6 g. (92%) of an orange solid which melted at 153–155° C.

*Analysis.*—Calcd. for $C_{17}H_{17}N_3O_3$ (percent): C, 65.58; H, 5.50; N, 13.50. Found (percent): C, 65.40; H, 5.42; N, 13.41.

EXAMPLE 2

1-phenyl-3-(4-aminobenzamido)pyrrolidine

A suspension of 10 g. of 1-phenyl-3-(4-nitrobenzamido)pyrrolidine in 250 ml. of 95% ethanol containing 5% palladium on charcoal was shaken in a Paar hydrogenator in three atmospheres of hydrogen at room temperature. The reduction mixture was filtered and the filtrate concentrated to give 3.8 g. of crystalline product which melted at 213–216° C.

*Analysis.*—Calcd. for $C_{17}H_{19}N_3O$ (percent): C, 72.57; H, 6.81; N, 14.94. Found (percent): C, 72.74; H, 6.76; N, 15.09.

EXAMPLE 3

1-benzyl-3-(N-phenylpropionamino)pyrrolidine

A stirred mixture of 25.2 g. (0.1 mole) of 1-benzyl-3-anilinopyrrolidine and 30 g. of potassium carbonate in 200 ml. of chloroform was treated dropwise with 10 g. (0.11 mole) of propionyl chloride in 25 ml. of chloroform. After addition, the mixture was stirred four hours, 100 ml. of water added, the mixture stirred 30 minutes the chloroform layer separated, dried over magnesium sulfate and evaporated under reduced pressure to an oil. The pure product distilled at 180° C./0.02 mm. to give 24 g. (78%) of product. The oil solidified on standing and melted at 57–60° C.

*Analysis.*—Calcd. for $C_{20}H_{24}N_2O$ (percent): C, 77.88; H, 7.84; N, 9.08. Found (percent): C, 77.75; H, 7.86; N, 8.92.

EXAMPLE 4

1-(2-phenoxyethyl)-3-[N-(2-methoxyphenyl) propionamindo]pyrrolidine

A mixture of 5 g. (0.02 mole) of 3-[N-(2-methoxyphenyl)propionamido]pyrrolidine, 4.05 g. (0.02 mole) of 2-phenoxyethyl bromide and 5 g. of sodium bicarbonate and 50 ml. of isopropanol water refluxed eight hours. The mixture was diluted with water, extracted with chloroform, the chloroform extracts combined, dried over magnesium sulfate and evaporated to an oil (8 g.). The oil was dissolved in benzene and chromatographed on 250 g. of 60–100 mesh magnesium silicate. The column was eluted with benzene containing increasing amounts of acetone. The pure product, 3.8 g. (52%), was molecularly distilled for analysis.

*Analysis.*—Calcd. for $C_{22}H_{28}N_2O_3$ (percent): C, 71.71; H, 7.66; N, 7.60. Found (percent): C, 71.84; H, 7.71; N, 7.58.

EXAMPLES 5–13

The physical constants for Examples 5 through 13 are tabulated in Table I. The compounds were prepared according to the procedures described in Examples 1 through 3.

TABLE I

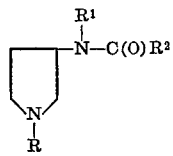

| | | | | | Analysis | | | | | |
|---|---|---|---|---|---|---|---|---|---|---|
| | | | | | Calculated | | | Found | | |
| R | $R^1$ | $R^2$ | M.P.B.P./ mm. °C. | | C | H | N | C | H | N |
| Example: | | | | | | | | | | |
| 5ᵃ ........ $CH_2CH=CH_2$ | $C_6H_5$ | $C_2H_5$ | 139–41 | | 62.05 | 6.94 | 8.04 | 61.76 | 6.86 | 8.08 |
| 6 ........ $C_6H_5$ | $CH_3$ | $C_6H_4$—$4NO_2$ | 149–50 | | 66.44 | 5.89 | 12.92 | 66.37 | 5.93 | 12.83 |
| 7 ........ Same | $CH_3$ | $C_6H_4$—$4NH_2$ | 168–70 | | 73.19 | 7.17 | 14.23 | 72.77 | 7.10 | 14.22 |
| 8 ........ do | H | $C_2H_5$ | 135–37 | | 71.52 | 8.31 | 12.83 | 71.29 | 8.13 | 12.88 |
| 9 ........ do | H | Same | 153–55 | | 76.66 | 6.81 | 10.52 | 76.58 | 6.72 | 10.48 |
| 10 ........ do | n-$C_4H_9$ | $C_6H_4$—$4NH_2$ | ............. | | 74.74 | 8.07 | 12.45 | 74.66 | 7.91 | 12.49 |
| 11 ........ $C_6H_5$—$CH_2$— | 2-$CH_3OC_6H_4$ | $C_2H_5$ | 190/0.03 | | 74.52 | 7.74 | 8.28 | 74.34 | 7.74 | 8.40 |
| 12ᵇ ........ H | Same | Same | 132–35 | | 59.33 | 6.64 | 7.69 | 59.26 | 6.63 | 7.72 |
| 13 ........ $C_2H_5$ | $C_6H_5$ | $CH_2OC_6H_4$—4Cl | ............. | | 66.93 | 6.46 | 7.81 | 66.60 | 6.60 | 7.70 |

ᵇ Oxalate salt.
ᵃ Fumarate salt.

EXAMPLE 14

1-phenethyl-3-(N-phenylpropionamido)pyrrolidine fumarate

A mixture of 1-phenethyl-3-anilinopyrrolidine (10.0 g., 0.038 mole), propionic anhydride (5.9 g., 0.045 mole) and 50 ml. of benzene was refluxed four hours, cooled, washed with 10% sodium bicarbonate and water. The benzene solution was dried over sodium sulfate and the solvent was evaporated. The residual oil (11 g.), fumaric acid (2.7 g., 0.023 mole) and 100 ml. of isopropanol was refluxed for 15 minutes, filtered, cooled and the filtrate diluted with isopropyl ether. The crystalline product melted at 105–107.5° C. after several recrystallizations from isopropanol-isopropyl ether and weighed 6.9 g. (59% yield).

*Analysis.*—Calcd. for $C_{25}H_{30}N_2O_5$ (percent): C, 68.47; H, 6.90; N, 6.39. Found (percent): C, 68.30; H, 6.90; N, 6.47.

EXAMPLE 15

1-methyl-3-[N-phenyl-(4-chlorobenzamido)] pyrrolidine fumarate

A solution of 4-chlorobenzoyl chloride prepared from 10.9 g. (0.07 mole) of 4-chlorobenzoic acid and excess thionyl chloride in 50 ml. of chloroform was added slowly to 10.6 g. (0.06 mole) of 1-methyl-3-anilinopyrrolidine in 40 ml. of chloroform. The mixture was refluxed gently 16 hours, the solvent evaporated at reduced pressure, the residue treated with 100 ml. of 2 N sodium hydroxide solution and the basic mixture extracted with two 200 ml. portions of ether. The combined ether extracts were washed several times with cold water, dried over magnesium sulfate, and concentrated to yield a residue which weighed 18.2 g. (97% yield). The fumarate salt which was prepared using isopropanol-isopropyl ether melted at 124–126° C.

*Analysis.*—Calcd. for $C_{22}H_{23}ClN_2O_5$ (percent): C, 61.32; H, 5.38; N, 6.50. Found (percent): C, 60.95; H, 5.55; N, 6.74.

EXAMPLE 16

1-ethyl-3-[N-(3-trifluoromethylphenyl)propionamido]-pyrrolidine fumarate

A mixture of 20.0 g. (0.078 mole) of 1-ethyl-3-(3-trifluoromethylanilino)pyrrolidine, 13.7 g. (0.095 mole) of propionic anhydride, several drops of pyridine and 100 ml. of benzene was refluxed 16 hours. The cooled mixture was washed with 10% sodium bicarbonate solution and water. The benzene was evaporated, the residual oil was distilled at reduced pressure and the fraction boiling at 103–105° C./.05 mm. collected. The colorless, non-viscous oil weighed 15.0 g. (61% yield). The fumarate salt which was prepared using isopropanol-isopropyl ether weighed 10.5 g. (85% yield) and melted at 155–156° C.

*Analysis.*—Calcd. for $C_{20}H_{25}N_2O_5F_3$ (percent): C, 55.81; H, 5.85; N, 6.51. Found (percent): C, 55.86; H, 5.98; N, 6.47.

EXAMPLE 17

1-(2-phenoxyethyl)-3-(N-phenylpropionamido) pyrrolidine hydrochloride

A mixture of 9.9 g. (0.035 mole) of 3-anilino-1-(2-phenoxyethyl)pyrrolidine, 6.5 g. (0.05 mole) of propionic anhydride and 50 ml. of benzene was refluxed 16 hours, cooled and washed with 10% sodium bicarbonate solution and water. The solvent was evaporated and the residual oil was distilled at reduced pressure. The colorless, viscous oil distilled at 183–185° C./.03 mm. and weighed 8.5 g. (72% yield). The hydrochloride salt which was prepared was recrystallized several times from an isopropanol-isopropyl ether mixture and melted at 115–118° C.

*Analysis.*—Calcd. for $C_{21}H_{27}ClN_2O_2$ (percent): C, 67.27; H, 7.26; N, 7.47. Found (percent): C, 67.33; H, 7.28; N, 7.36.

EXAMPLE 18

1-[2-(2-methoxyphenoxy)ethyl]-3-(N-phenylpropionamido)-pyrrolidine

A mixture of 7.8 g. (0.025 mole) of 3-anilino-1-[2-(2-methoxyphenoxy)ethyl[pyrrolidine, 5.9 g. (0.045 mole) of propionic anhydride and 50 ml. of benzene was refluxed 16 hours, cooled and washed with 10% sodium bicarbonate and water. The benzene solution was dried over magnesium sulfate, the solvent evaporated, and the residual oil in benzene was chromatographed on 300 g. of 60–100 mesh magnesium silicate, eluting with a 1% methanol-benzene mixture. The product weighed 4.5 g. (49% yield). A portion of the oil was distilled at reduced pressure and the fraction distilling at 192–194° C./0.002 mm. collected.

*Analysis.*—Calcd. for $C_{22}H_{28}N_2O_3$ (percent): C, 71.71; H, 7.66; N, 7.60. Found (percent): C, 71.57; H, 7.60; N, 7.47.

EXAMPLES 19–48

The physical constants for Examples 19 through 48 are tabulated in Table II. The compounds were prepared according to the procedures described in Examples 14 through 18.

TABLE II

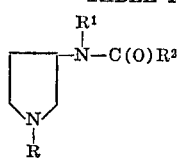

| Example | R | R¹ | R² | M.P. B.P./mm., °C. | Calculated C | Calculated H | Calculated N | Found C | Found H | Found N |
|---|---|---|---|---|---|---|---|---|---|---|
| 19 a | $CH_3$ | $C_6H_5$ | $CH_3$ | 110–13 | 61.06 | 6.63 | 8.38 | 59.69 | 6.37 | 8.28 |
| 20 | $C_6H_5CH_2$— | H | Same | 165/0.05 | 71.52 | 8.31 | 12.84 | 71.42 | 8.35 | 12.71 |
| 21 a | $CH_3$ | $C_6H_5$ | $C_2H_5$ | 133–34 | 62.05 | 6.94 | 8.04 | 62.10 | 6.97 | 8.08 |
| 22 b | $C_6H_5CH_2$ | $C_6H_4$—2—OH | Same | 92–94 | 63.76 | 6.32 | 6.76 | 63.45 | 6.40 | 6.57 |
| 23 | $C_6H_5CH_2$— | $C_6H_4$—3—OH | ----do---- | 122.5–24.5 | 74.04 | 7.46 | 8.63 | 74.16 | 7.43 | 8.59 |
| 24 a | $CH_3$ | $C_6H_{11}$ | $C_6H_2$—3,4,5$CH_3O$ | 169–71.5 | 60.96 | 7.32 | 5.68 | 60.60 | 7.40 | 5.77 |
| 25 | $C_6H_{11}$ | H | $C_6H_4$—4$NO_2$ | 152–53 | 64.33 | 7.30 | 13.24 | 64.23 | 7.34 | 13.27 |
| 26 | $CH_3$ | $C_6H_5$ | $C_6H_5CH_2$ | 135–140/0.04 | 77.52 | 7.53 | 9.52 | 76.88 | 7.54 | 9.36 |
| 27 c | $C_6H_{11}$ | H | $C_6H_4$—4$NH_2$ | 98–100 | 66.85 | 8.91 | 13.76 | 66.51 | 8.74 | 13.73 |
| 28 | $C_6H_5CH_2$— | H | $C_6H_2$—3,4,5$CH_3O$ | 128–29 | 68.09 | 7.08 | 7.56 | 68.00 | 7.26 | 7.62 |
| 29 | $CH_3$ | $C_6H_5$ | $C_6H_5$ | 97–99 | 77.11 | 7.19 | 9.99 | 77.08 | 7.24 | 9.96 |
| 30 a | Same | Same | $C_6H_2$—3,4,5$CH_3O$ | 154–55 | 61.72 | 6.22 | 5.76 | 62.03 | 6.08 | 5.79 |
| 31 d | ----do---- | ----do---- | $CH_2OC_6H_4$—4Cl | 105–108 | 59.93 | 5.47 | 6.08 | 60.12 | 5.64 | 6.17 |
| 32 | $C_6H_5$ | H | Same | 99–101 | 65.50 | 5.79 | 8.48 | 65.30 | 5.91 | 8.47 |
| 33 e | Same | $C_4H_9$ | ----do---- | 142–44 | | | 7.47 | | | 7.28 |
| 34 b | $CH_3$ | $C_6H_5$ | $CH_2OC_6H_5$ | 138–39 | 62.99 | 6.04 | 7.00 | 62.97 | 6.01 | 7.03 |
| 35 | $C_6H_{11}$ | H | —$C_6H_5$ | 129–130 | 74.96 | 8.88 | 10.29 | 75.20 | 8.83 | 10.28 |
| 36 b | $CH_3$ | $C_6H_5$ | $C_6H_4$—3$CF_3$ | 92–95 | 57.53 | 4.83 | 6.39 | 57.66 | 5.01 | 6.33 |
| 37 b | Same | Same | $C_6H_4$—3Cl | 124.5–126.5 | 59.33 | 5.23 | 6.92 | 59.28 | 5.26 | 6.97 |
| 38 b | ----do---- | ----do---- | $C_6H_4$—4F | 127–129 | 61.85 | 5.45 | 7.21 | 61.65 | 5.55 | 7.22 |
| 39 b | $C_6H_5C_2H_5$ | ----do---- | $C_6H_4$—4Cl | 152–154 | 65.52 | 5.50 | 5.66 | 65.27 | 5.55 | 5.60 |
| 40 | $CH_3$ | ----do---- | $C_6H_4$—4Br | 75–80 | 60.18 | 5.33 | 7.80 | 60.22 | 5.22 | 7.73 |
| 41 e | $C_6H_5CH_2$ | ----do---- | $C_6H_5$ | 192–193 | 73.36 | 6.41 | 7.13 | 73.11 | 6.47 | 7.02 |
| 42 e | H | ----do---- | Same | 187–189 | 67.43 | 6.32 | 9.25 | 67.18 | 6.39 | 9.14 |
| 43 b | $CH_3$ | ----do---- | $C_6H_4$—4$CH_3O$ | 139.5–141.5 | 62.99 | 6.04 | 7.00 | 62.95 | 6.07 | 6.92 |
| 44 b | $C_2H_5$ | $C_6H_4$—3$CF_3$ | $C_6H_5$ | 110–112 | 58.40 | 5.12 | 6.19 | 58.40 | 5.22 | 6.18 |
| 45 b | Same | $C_6H_4$—4Cl | Same | 164.5–167 | 62.46 | 6.07 | 7.69 | 62.62 | 6.09 | 7.61 |
| 46 b | $CH_3$ | $C_6H_5$ | $C_6H_4$—4$CH_3$ | 158–160 | 65.61 | 6.29 | 7.29 | 65.68 | 6.32 | 7.31 |
| 47 e | $C_2H_5$ | $C_6H_4$—4Cl | $C_6H_4$—4Cl | 207–209 | 57.08 | 5.30 | 7.01 | 57.39 | 5.28 | 7.01 |
| 48 b | Same | $C_6H_5$ | Same | 131–132 | 60.21 | 5.53 | 6.69 | 59.97 | 5.53 | 6.63 | a Fumarate salt; b Oxalate salt; c Hydrate; d Maleate salt; e Hydrochloride salt.

FORMULATION AND ADMINISTRATION

Useful compositions containing at least one of the compounds according to the invention in association with a pharmaceutical carrier or excipient may be prepared in accordance with conventional technology and procedures. Thus, the compounds may be presented in a form suitable for oral or parenteral administration. For example, compositions for oral administration can be solid or liquid and can take the form of capsules, tablets, coated tablets and suspensions, such compositions comprising carriers or excipients conveniently used in the pharmaceutical art. Suitable tableting excipients include lactose, potato, and maize starches, talc, gelatin, and stearic, and silicic acids, magnesium stearate, and polyvinyl pyrrolidone.

For parenteral administration, the carrier or excipient may be a sterile, parenterally acceptable liquid; e.g., water or a parenterally acceptable oil; e.g., arachis oil contained in ampules.

Advantageously, the compositions may be formulated as dosage units, each unit being adapted to supply a fixed dose of active ingredients. Tablets, capsules, coated tablets and ampules are examples of preferred dosage unit forms according to the invention. Each dosage unit adapted for oral administration can conveniently contain 5 to 500 mg. and preferably 20 to 200 mg. of the active ingredient, whereas each dosage unit adapted for intramuscular administration can conveniently contain 5 to 100 mg. and preferably 10 to 75 mg. of the active ingredient.

The following formulations are representative for all of the pharmacologically active compounds of the invention, and especially a pharmacologically acceptable salt thereof.

(1) Capsules

Capsules of 5, 25 and 50 mg. of active ingredient per capsule are prepared. With the higher amounts of active ingredient, reduction may be made in the amount of lactose.

| Typical blend for encapsulation: | Per capsule, mg. |
| --- | --- |
| Active ingredient, as salt | 5.0 |
| Lactose | 296.7 |
| Starch | 129.0 |
| Magnesium stearate | 4.3 |
| Total | 435.0 |

(2) Tablets

A typical formulation for a tablet containing 5 mg. of active ingredient per tablet follows. The formulation may be used for other strengths of active ingredient by adjustment of weight of dicalcium phosphate.

| | Per tablet, mg. |
| --- | --- |
| (1) Active ingredient, as salt | 5.0 |
| (2) Corn starch | 13.6 |
| (3) Corn starch (paste) | 3.4 |
| (4) Lactose | 79.2 |
| (5) Dicalcium phosphate | 68.2 |
| (6) Calcium stearate | 0.9 |
| Total | 170.3 |

Uniformly blend 1, 2, 4 and 5. Prepare 3 as a ten percent paste in water. Granulate the blend with starch paste and pass the wet mass through an eight-mesh screen. The wet granulation is dried and sized through a twelve-mesh screen. The dried granules are blended with the calcium stearate and compressed.

Additional tablet formulations preferably contain a higher dosage of the active ingredient and are as follows:

50 mg. tablet

| Ingredients: | Per tablet, mg. |
| --- | --- |
| Active ingredient, as salt | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, starches, and dicalcium phosphate when present. The blend is then granulated using water as a granulating medium. The wet granules are passed through an eight-mesh screen and dried at 140–160° Fahrenheit over night. The dried granules are passed through a ten-mesh screen, blended with the proper amount of calcium stearate, and the lubricated granules then converted into tablets on a suitable tablet press.

(3) Injectable—2% sterile solution

Per cc.
Active ingredient _____ 20 mg.
Preservative, e.g., chlorobutanol ___ 0.5% weight/volume.
Water for injection, q.s.

Prepare solution, clarify by filtration, fill into vials, seal, and autoclave.

Various modifications in the compounds, compositions and methods of the invention will be apparent to one skilled in the art and may be made without departing from the spirit or scope thereof, and it is therefore to be understood that the invention is to be limited only by the scope of the appended claims.

What is claimed:
1. A compound selected from
(a) 3-amidopyrrolidines having the formula:

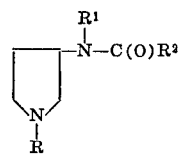

wherein;

R is selected from the group consisting of hydrogen, lower-alkyl, allyl, phenyl, phenoxy-lower-alkyl, cyclohexyl, and phenyllower-alkyl, $R^1$ is selected from the group consisting of hydrogen, loweralkyl, phenyl, cyclohexyl, lower-alkoxy phenyl, hydroxyphenyl, halophenyl and trifluoromethylphenyl, $R^2$ is selected from the group consisting of lower-alkyl, phenyl, nitrophenyl, aminophenyl, halophenyl, lower-alkoxy-phenyl, phenoxy - lower - alkyl, halophenoxy-lower-alkyl, lower-alkyl-phenyl and trifluoromethylphenyl, and (b) pharmaceutically acceptable acid addition salts thereof with the proviso that when R is lower alkyl, $R^1$ cannot be hydrogen.

2. A compound as defined in claim 1 which is 1-benzyl-3-(N-phenylpropionamido)pyrrolidine.

3. A compound as defined in claim 1 which is 1-(2-phenoxyethyl)-3-[N-(2 - methoxyphenyl)propionamido] pyrrolidine.

4. A compound as defined in claim 1 which is 1-allyl-3-(N-phenylpropionamido)pyrrolidine.

5. A compound as defined in claim 1 which is 1-(2-phenylethyl)-3-(N-phenylpropionamido)pyrrolidine.

6. A compound as defined in claim 1 which is 1-methyl-3-(N-phenyl-4-chlorobenzamido)pyrrolidine.

7. A compound as defined in claim 1 which is 1-(2-phenoxyethyl)-3-(N-phenylpropionamido)pyrrolidine.

8. A compound as defined in claim 1 which is 1-[2-(o-methoxyphenoxy)ethyl] - 3 - (N-phenylpropionamido)pyrrolidine.

9. A compound as defined in claim 1 which is 1-methyl-3-(N-phenylbenzamido)pyrrolidine.

10. A compound as defined in claim 1 which is 1-ethyl-3-(N-phenyl-4-chlorobenzamido)pyrrolidine.

11. A compound as defined in claim 1 which is 1-ethyl-3-[N-(3-trifluoromethylphenyl)benzamido]pyrrolidine.

12. A compound as defined in claim 1 which is 1-methyl - 3 - (N-phenyl - 3 - trifluoromethylbenzamido)pyrrolidine.

13. A compound as defined in claim 1 which is 1-methyl-3-(N-phenyl-3-chlorobenzamido)pyrrolidine.

14. A compound as defined in claim 1 which is 1-methyl-3-(N-phenyl-4-fluorobenzamido)pyrrolidine.

15. A compound as defined in claim 1 which is 3-(N-phenylbenzamido)pyrrolidine.

References Cited

Wagner et al., Synthetic Organic Chemistry (1953) pp. 566–68.

ALEX MAZEL, Primary Examiner

J. A. NARCAVAGE, Assistant Examiner

U.S. Cl. X.R.

260—326.85; 424—274